(12) United States Patent
Narayanan

(10) Patent No.: US 9,310,974 B1
(45) Date of Patent: Apr. 12, 2016

(54) ZOOM-BASED INTERFACE NAVIGATION

(71) Applicant: Amazon Technologies, Inc., Reno, NV (US)

(72) Inventor: Ganesh Narayanan, Tamil Nadu (IN)

(73) Assignee: Amazon Technologies, Inc., Seattle, WA (US)

( * ) Notice: Subject to any disclaimer, the term of this patent is extended or adjusted under 35 U.S.C. 154(b) by 263 days.

(21) Appl. No.: 13/965,044

(22) Filed: Aug. 12, 2013

(51) Int. Cl.
*G06F 3/048* (2013.01)
*G06F 3/0484* (2013.01)

(52) U.S. Cl.
CPC ................................. *G06F 3/0484* (2013.01)

(58) Field of Classification Search
CPC .............. G06F 2201/81; G06F 1/169; G06F 2203/0339
See application file for complete search history.

(56) References Cited

U.S. PATENT DOCUMENTS

| | | | |
|---|---|---|---|
| 2005/0195154 A1* | 9/2005 | Robbins et al. | 345/156 |
| 2009/0198607 A1* | 8/2009 | Badger et al. | 705/37 |
| 2012/0151413 A1* | 6/2012 | Nurmi et al. | 715/825 |
| 2013/0293490 A1* | 11/2013 | Ward et al. | 345/173 |
| 2014/0109004 A1* | 4/2014 | Sadhvani et al. | 715/810 |

OTHER PUBLICATIONS

'Bevodesign presents The Microfilm Navigation' screenshots, http://www.zoomism.com, accessed on Jun. 5, 2013, in 7 pages.
'Prophets of Zoom', The Economist, Technology Quarterly: Q2 2012, Jun. 2, 2012, available at www.economist.com/node/21556097/print, in 3 pages.
'Zooming user interface', last modified on May 20, 2013, available at http://en.wikipedia.org/wiki/Zooming_user_interface, accessed on Jun. 5, 2013, in 3 pages.

* cited by examiner

*Primary Examiner* — William Bashore
*Assistant Examiner* — Rayeez Chowdhury
(74) *Attorney, Agent, or Firm* — Knobbe, Martens, Olson & Bear, LLP

(57) ABSTRACT

Systems and methods are provided for generating a user interface that enables a user to navigate content by requesting to zoom in or zoom out within the user interface. For example, an initial user interface that includes content at an initial zoom level may be generated for display. Based on a request to view content displayed in the initial user interface at a second zoom level, an updated user interface may be generated. The updated user interface may include an enlarged representation of some of the content previously displayed in the initial user interface and/or content not previously displayed at the initial zoom level. In some cases, the updated user interface may include dynamically generated content that is generated based at least in part on a user selection received in association with content displayed at a previously presented zoom level.

16 Claims, 7 Drawing Sheets

ZOOM-BASED INTERFACE NAVIGATION

BACKGROUND

Client computing devices may request files, such as network pages, from one or more servers over a network. As one example, a client computing device may receive a page from a server, such as a HyperText Markup Language ("HTML") page, that include references to one or more image files or other content to be presented for display. The client computing device may then request the one or more image files from the appropriate server and present the image files for display, along with other content of the page. A typical user interface presented by a browser or similar software installed on a client computing device for displaying a network page may include selectable links or other selectable options that a user may select via a cursor or other navigational mechanism in order to request a new network page from a server. For example, a user interface displaying a network page that lists a number of products available for purchase may enable a user to select identification information for one of the products in order to request a new network page that includes additional information regarding the selected product. Some browsers, such as those executed on mobile computing devices, enable a user to zoom in and zoom out of content presented by a browser executed by the computing device.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to generating user interfaces that dynamically update in response to user zoom requests. For example, aspects of the present disclosure may enable a user to view additional information associated with portions of a page by requesting to zoom in on or near the given portion. In response to a zoom request, a new page view or updated user interface may be generated that includes additional text, images, video or other content that was not previously displayed at the initial zoom level. As one example, code associated with a page may indicate that user instructions for completing a user-fillable form should not be displayed when the page is viewed at an initial zoom level, but should be added to an updated view of the page once a user requests to zoom in to a threshold zoom level associated with the given instruction text. The code associated with a page, according to some embodiments, may specify content to be displayed at each of a number of different zoom levels, such that a user may effectively navigate between content by zooming in and zooming out within a single page or user interface rather than by requesting additional pages. In some embodiments, content displayed at successive zoom levels may be dynamically generated based at least in part on user input received at a prior zoom level, as will be discussed in more detail below.

In some embodiments, zoom-based navigation of a user interface, as disclosed herein, may be implemented based at least in part on one or more files that define content to be displayed at various zoom levels. A "file" as used herein may refer to content of a variety of types that may be displayed in a user interface, such as by presenting content of the file and/or by generating a user interface based on code and/or references within the file. A page, which may be one example of a file, may include text and/or code of various types, such as JavaScript, HTML, Cascading Style Sheets ("CSS"), etc. According to some embodiments, a browser application and/or navigation application, as disclosed herein, may be configured to interpret code or instructions for a specialized file type that includes information identifying content to be displayed at each of a number of different zoom levels. For example, a file that is capable of presenting different granularities of information or content at N different zoom levels may include N different controllers or code segments that are each associated with a different zoom level and that are interpreted or loaded by a browser application and/or navigation application upon a user request to view content at the corresponding zoom level. In other embodiments, existing programming languages, markup languages, scripting languages and/or file types associated with interactive browser content and/or asynchronous page loading may be employed to implement aspects of the present disclosure.

Figure 1:
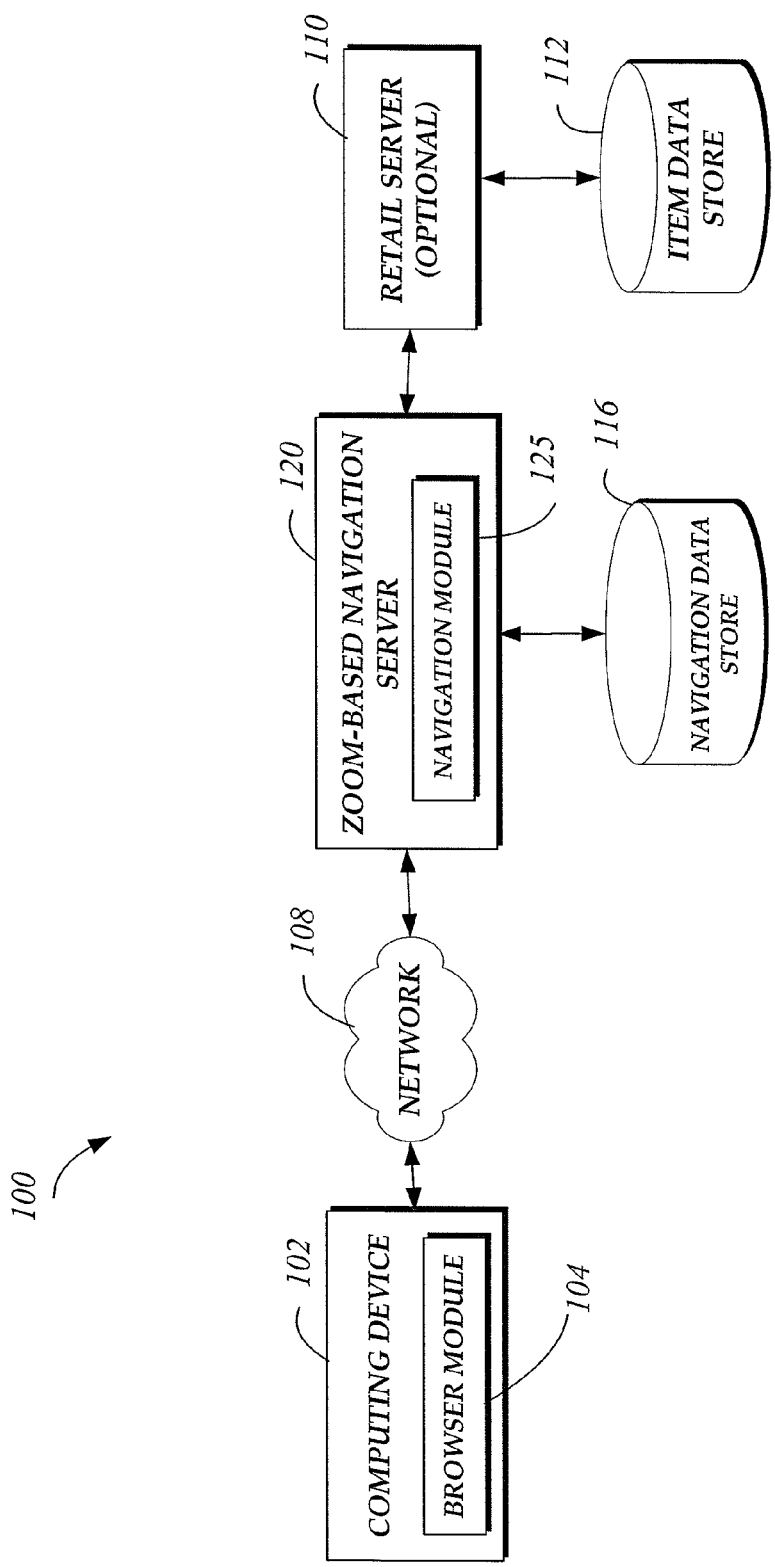
FIG. 1 is a block diagram depicting an illustrative operating environment in which user interfaces may be presented for display and navigated via zoom-based navigation techniques.

The illustrative operating environment shown in FIG. 1 includes a system 100 in which users may be presented with zoom-enabled user interfaces generated at least in part by a zoom-based navigation server 120. In the illustrative operating environment, users may browse and then place orders for items (such as products listed in an electronic catalog associated with retail server 110) after zooming in and then utilizing the order interface. In other embodiments, a zoom-based navigation server 120 may generate zoom-enabled user interfaces outside of a retail environment. The system 100 may include one or more zoom-based navigation servers 120 that include a navigation application 125 that may be used to implement various aspects of the present disclosure, such as generating user interfaces that may be navigated via zoom requests and dynamically updating user interfaces in response to such requests. In some embodiments, a browser application 104 present on computing device 102 may communicate with the navigation application 125, such as by sending navigation requests in response to user interaction with a generated user interface. The environment also includes one or more optional retail servers 110 that may facilitate electronic browsing and purchasing of items, such as digital content items and/or physical items, using various user devices, such as computing device 102. Those skilled in the art will recognize that the computing device 102 may be any of a number of computing devices that are capable of communicating over a network including, but not limited to, a laptop, personal computer, personal digital assistant (PDA), hybrid PDA/mobile phone, mobile phone, electronic book reader, digital media player, tablet computer, game console or controller, and the like.

The zoom-based navigation server 120, which will be described below in more detail, may be connected to or in communication with a navigation data store 116 that may store various files that may be requested for viewing by the computing device 102, such as pages and/or content referenced in code of the pages. The navigation data store 116 may additionally store various code modules, rule sets and/or other data that may be used by the navigation application 125 to determine how to respond to zoom in and zoom out requests received in association with a user interface presented for display by computing device 102. The retail server 110 may be connected to or in communication with an item data store 112 that stores item information regarding a number of items, such as items available for browse and/or purchase via the retail server 110. Item data stored in item data store 112 may include any information related to each item. For example, item data may include, but is not limited to, price, availability, title, item identifier, item feedback (e.g., user reviews, ratings, etc.), item image, item description, item attributes, keywords associated with the item, etc. In some embodiments, the item data store 112 may store digital content items (e.g., audiobooks, electronic books, music, movies, multimedia works, text documents, etc.). In other embodiments, the information in item data store 112 and navigation data store 116 may be stored in a single data store connected to or in communication with the zoom-based navigation server 120 and/or retail server 110. In some embodiments, the retail server 110 may additionally be connected to or in communication with a user data store (not illustrated) that stores user data associated with users of retail server 110, such as shipping and billing information, purchase history, browsing history, item reviews and ratings, user preferences, etc.

In different embodiments, each of item data store 112 and/or navigation data store 116 may be local to zoom-based navigation server 120, may be local to retail server 110, may be remote from both zoom-based navigation server 120 and retail server 110, and/or may be a network-based service itself. In the environment shown in FIG. 1, a user of the system 100 may utilize computing device 102 to communicate with the retail server 110 via a communication network 108, such as the Internet or other communications link. The network 108 may be any wired network, wireless network or combination thereof. In addition, the network 108 may be a personal area network, local area network, wide area network, cable network, satellite network, cellular telephone network, etc. or combination thereof. Protocols and components for communicating via the Internet or any of the other aforementioned types of communication networks are well known to those skilled in the art and, thus, are not described in more detail herein.

The system 100 is depicted in FIG. 1 as operating in a distributed computing environment including several computer systems that are interconnected using one or more computer networks. The system 100 could also operate within a computing environment having a fewer or greater number of components than are illustrated in FIG. 1. Thus, the depiction of system 100 in FIG. 1 should be taken as illustrative and not limiting to the present disclosure. For example, the system 100 could implement various Web services components and/or peer-to-peer network configurations to implement at least a portion of the processes described herein.

The zoom-based navigation server 120, which will be described in more detail below, may provide front-end communication with various user devices, such as computing device 102, via network 108. The front-end communication provided by the retail server 110 may include generating text and/or graphics, possibly organized as a user interface using hypertext transfer or other protocols in response to information inquiries received from the various user devices, including zoom requests associated with previously generated user interfaces. In some embodiments, portions of the user interfaces generated by the zoom-based navigation server 120 may be generated by the retail server 110 and/or may include data provided by the retail server 110. The retail server 110 may obtain information on available goods and services from one or more data stores, such as item data store 112, as is done in conventional electronic commerce systems. In certain embodiments, the retail server 110 may also access item data from other data sources, either internal or external to system 100. While system 100 illustrates an embodiment in which the zoom-based navigation server 120 communicates with a retail server 110, in other embodiments, a zoom-based navigation server 120 may operate independently of a retail environment. In such embodiments, the zoom-based navigation server 120 may communicate with the computing device 102 and/or item data store 112 without the presence of a retail server. In other embodiments, the computing device 102 may include a navigation application, as described herein, such that a separate navigation server may not be present in certain embodiments.

Figure 2:
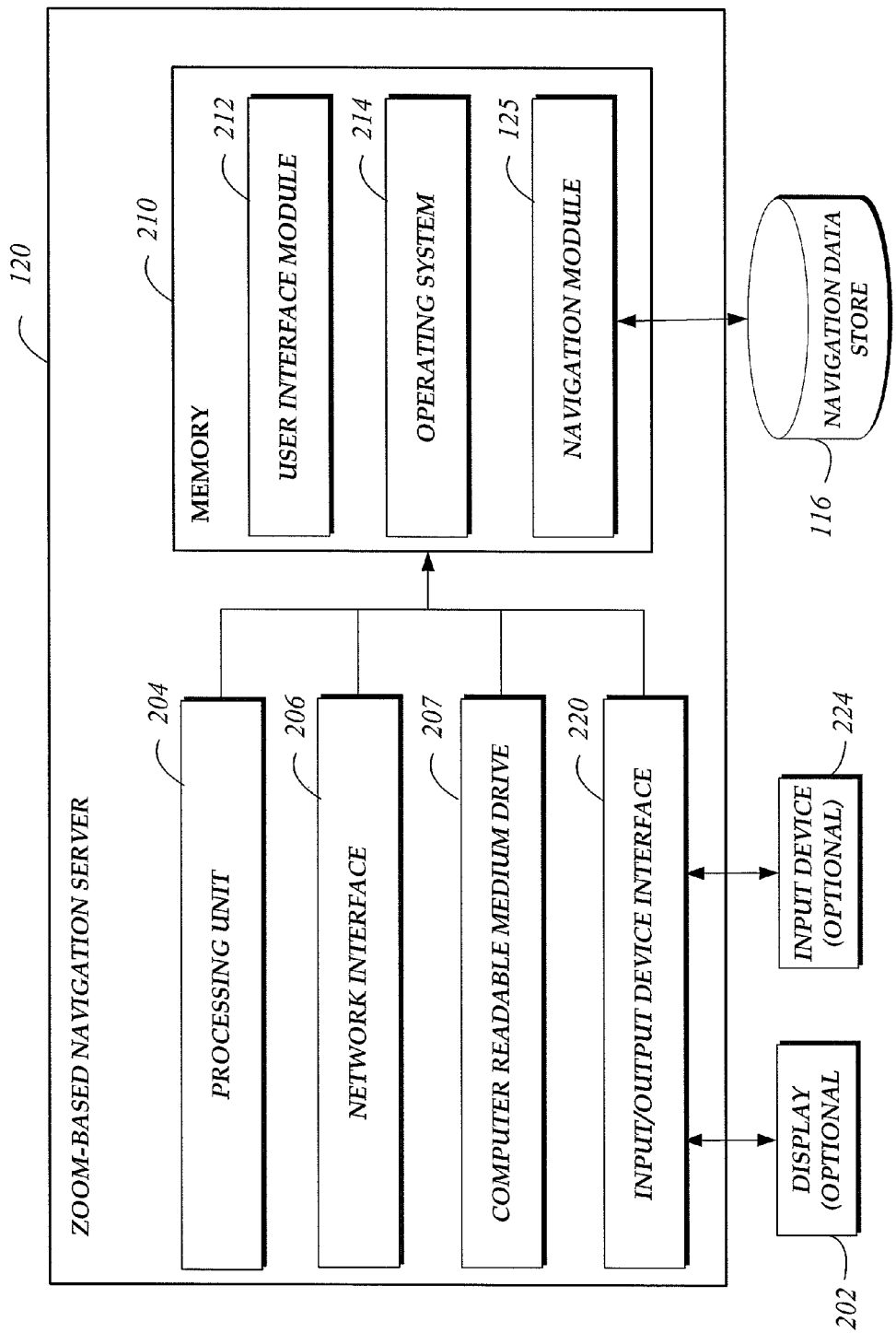
FIG. 2 depicts a general architecture of a server for generating zoom-based user interfaces and updating such user interfaces based on zoom requests.

FIG. 2 depicts an example of a general architecture of a zoom-based navigation server 120 for generating user interfaces and updating the user interfaces in response to user requests to zoom, pan and/or otherwise navigate content within the user interface. The general architecture of the zoom-based navigation server 120 depicted in FIG. 2 includes an arrangement of computer hardware and software components that may be used to implement aspects of the present disclosure. The zoom-based navigation server 120 may include many more (or fewer) components than those shown in FIG. 2. It is not necessary, however, that all of these generally conventional components be shown in order to provide an enabling disclosure. As illustrated, the zoom-based navigation server 120 includes a network interface 206, a processing unit 204, an input/output device interface 220, a display 202, an input device 224, and a computer readable medium drive 207, all of which may communicate with one another by way of a communication bus. The network interface 206 may provide connectivity to one or more networks or computing systems. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, microphone, touchscreen, joystick, etc.

The memory 210 may contain computer program instructions that the processing unit 204 executes in order to implement one or more embodiments. The memory 210 generally includes RAM, ROM and/or other persistent, auxiliary or non-transitory computer-readable media. The memory 210 may store an operating system 214 that provides computer program instructions for use by the processing unit 204 in the general administration and operation of the zoom-based navigation server 120. The memory 210 may further include computer program instructions and other information for implementing aspects of the present disclosure. For example, in one embodiment, the memory 210 includes a user interface module 212 that generates user interfaces (and/or instructions therefor) for display upon a computing device, e.g., via a navigation application such as a browser installed on the computing device. In addition, memory 210 may include or communicate with an auxiliary navigation data store 116 and/or one or more other data stores, as discussed above with reference to FIG. 1.

In addition to the user interface module 212, the memory 210 may include a navigation application 125 that may be executed by the processing unit 204. In one embodiment, the navigation application 125 implements various aspects of the present disclosure, e.g., determining portions of a user interface to be displayed at a particular zoom level, updating display of a user interface in response to a zoom request or other navigation request, etc., as described further below. While the navigation application 125 is shown in FIG. 2 as part of the zoom-based navigation server 120, in other embodiments, all or a portion of a navigation application may be a part of the retail server 110 and/or a user computing device, such as computing device 102. For example, in certain embodiments of the present disclosure, the retail server 110 may include several components that operate similarly to the components illustrated as part of the zoom-based navigation server 120, including a user interface module, navigation application, processing unit, computer readable medium drive, etc. In such embodiments, the retail server 110 may communicate with a navigation data store, such as navigation data store 116 and the zoom-based navigation server 120 may not be needed in certain embodiments. Further, although certain examples are illustrated herein in the context of a retail server 110, this is not a limitation on the systems and methods described herein, which may operate outside of a retail context.

While in the illustrated embodiment the zoom-based navigation server 120 implements updates of a user interface in response to zoom requests, in other embodiments, such user interface updates may be implemented partially or entirely by the user computing device 102. For example, application software and/or hardware may be present on the user computing device 102 to respond to zoom-based navigation requests, such as a specialized browser or browser plug-in. Accordingly, the user computing device 102 may include a navigation application 125 and other components that operate similarly to the components illustrated as part of the zoom-based navigation server 120, including a processing unit 204, network interface 206, non-transitory computer-readable medium drive 207, input/output interface 220, memory 210, user interface module 212, and so forth. Accordingly, in some embodiments, the browser application 104 of the computing device 102 may implement aspects of the present disclosure without communicating with a zoom-based navigation server. In some such embodiments, functionality described herein as being provided by the navigation application 125 may instead be provided by a browser application 104.

Figure 3:
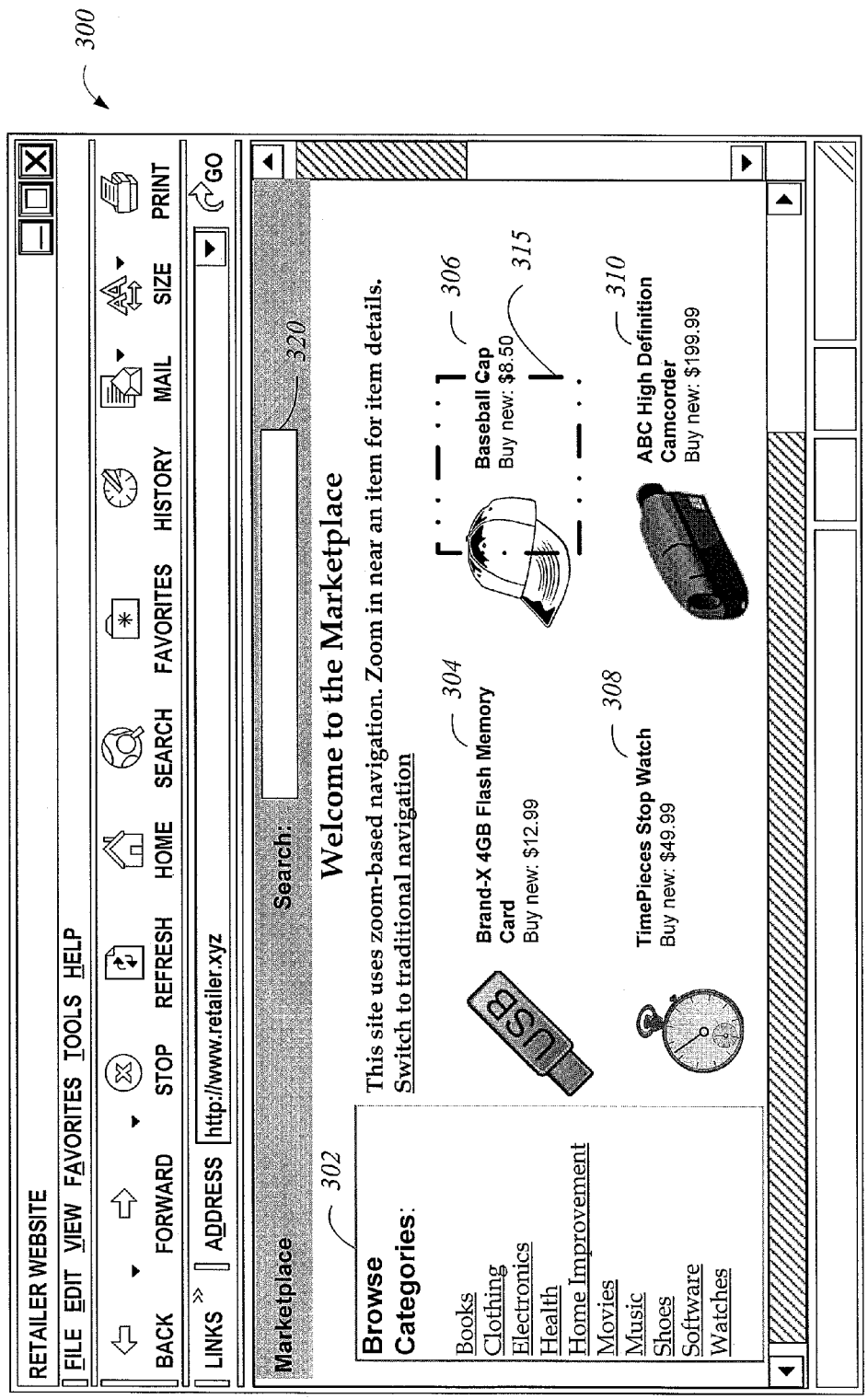
FIG. 3 is a pictorial diagram of an illustrative first zoom level of a user interface that enables a user to navigate within the user interface via zoom-based navigation requests.

FIG. 3 is a pictorial diagram of an illustrative first zoom level of a user interface 300 generated at least in part by navigation application 125 that enables a user to navigate within the user interface 300 and view additional information via zoom-based navigation requests. As shown, the user interface 300 is displayed via a browser operating upon a computing device, such as browser application 104 of computing device 102, utilized by a user. In the illustrated embodiment, zoom-based navigation of the user interface is enabled, but may be optionally disabled by the user if traditional point-and-click navigation between discrete pages is desired. In the illustrated example, the user interface 300 includes information identifying various items 304, 306, 308 and 310, which may be items that are available for purchase via retail server 110. For example, the information presented at the current, initial zoom level for item 306 includes a title ("Baseball Cap"), a price ($8.50) and an image of the item. The initial view of the user interface 300 additionally includes category browse options 302 and an item search field 320.

In the illustrated embodiment, user interface 300 is presented such that the user may navigate by requesting to pan, scroll, zoom in and/or zoom out relative to the current zoom level. For example, rather than a traditional cursor-based or touch-based selection of a category of interest to the user from category browse list 302, the user may request to zoom in near a given category name in order to view additional information regarding the given category and/or items listed within the given category. As another example, the user may enter a search string into the search field 320 and then request to zoom in near the search field in order to submit the entered search string to the zoom-based navigation server 120 or other server. An updated zoomed-in user interface may then be generated dynamically based on the entered text. Dynamically generated user interface updates in response to zoom requests will be discussed in more detail below.

In the embodiment illustrated in FIG. 3, the user may move the selection box 315 to select a portion of the user interface 300 in which the user is interested in zooming. For example, the location of the selection box 315 within the user interface 300 may be manipulated by the user via a mouse, joystick, scroll wheel, trackball or other input device in communication with computing device 102. In some embodiments, the selection box 315 may expand or contract in response to a user's indication of a desired area for zooming. For example, the user may select to decrease the size of the selection box 315 if the user is interested in a greater zoom amount in order to the view much finer details associated with a relatively small portion of the user interface 300. In other embodiments, the size of selection box 315 may automatically adjust in size according to the content within or near the selection box's location in the user interface 300. For example, if the user places the selection box 315 over portions of category browse list 302, the selection box may decrease in size from that presented in the FIG. 3 in order to generally correspond to the size of an individual category name displayed in category browse list 302.

The selection box 315, in embodiments other than that illustrated in FIG. 3, may be represented as some other visual indicator of location, such as a geometric shape, an icon, a visual effect (such as highlighting, blurring, sharpening, brightening, emboldening or otherwise distinguishing content underneath, within or near the indicator), crosshairs, a cursor and/or other indicator. In other embodiments, no visual indicator may be presented in association with zoom-enabled user interfaces. For example, touch-based controls, such as pinch gestures or tap gestures received via a touchscreen, may serve as the basis for zoom requests without the display of any visual indicator of a zoom location. In other embodiments, the center of the displayed user interface at the time of a zoom request may serve as the focal or center point for a zoom. In some such embodiments, the user may pan or scroll left, right, up or down within the displayed user interface 300 in order to center the displayed user interface in a desired location before requesting to zoom in or zoom out. Panning or scrolling may be initiated in various ways, depending on the embodiment.

For example, keyboard keys such as left, right, up and down arrows may control scroll or pan directions. In other embodiments, a user may move or manipulate a mouse, scroll wheel or other input device to pan or scroll in a given direction. In one embodiment, when an assigned key or button is held by the user, forward or backward movement (or up or down movement) received from an input device may be interpreted by the browser application as a request to scroll up and down within a current zoom level, while similar up or down movement received from the input device when the assigned button is not held may be interpreted by the browser application as a zoom in or zoom out request to change the current zoom level.

In the illustrated embodiment, the user may request to zoom in on a portion of the displayed user interface 300 in a variety of ways. As some examples, the user may press an assigned key on a keyboard, press a mouse button, scroll up or down using a scroll wheel, tap a touchscreen, make a pinch motion with two fingers via a touchscreen or touchpad, or otherwise make a gesture assigned to be used as a zoom in or zoom out request. In some embodiments, the user may select a desired one or more keys, buttons, gestures or other mechanisms for zooming in or zooming out, such as via user preferences associated with browser application 104 and/or user preferences associated with the user's account with the zoom-based navigation server 120 and/or retail server 110. In some embodiments, a user interface generated by the zoom-based navigation server 120, such as user interface 300, may accept a combination of traditional selection-based user interface requests and zoom-based navigation requests. For example, in one embodiment, a user may select to view a new user interface that lists books for sale by selecting the "Books" text in browse categories 302 using traditional point-and-click navigation techniques, or may instead view more details regarding item 306 by requesting to zoom in near the information identifying the item in user interface 300.

Figure 4:
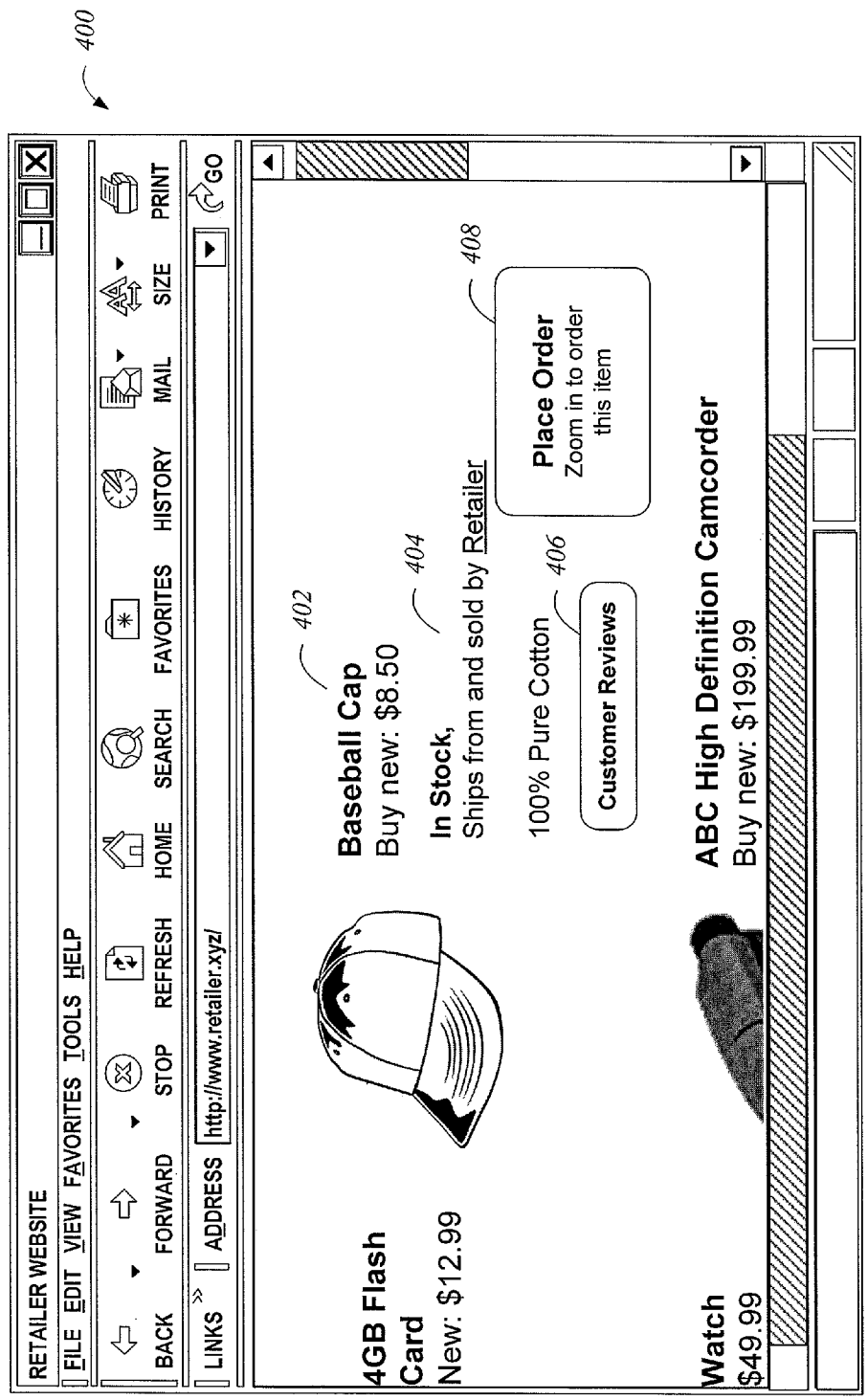
FIG. 4 is a pictorial diagram of an illustrative second zoom level of a portion of an initially presented user interface displayed in response to a zoom-based navigation request.

FIG. 4 is a pictorial diagram of an updated user interface 400 that presents a second zoom level of a portion of an initially presented user interface or page. In the illustrated embodiment, updated user interface 400 may have been updated by the navigation application 125 in response to a request received from the computing device 102 indicating that the user requested to zoom in on the area defined by selection box 315 in user interface 300 discussed above. The browser application 104 and/or navigation application 125 may have received an indication of a zoom location within the user interface 300 in which to zoom in. While the zoom location in the illustrated embodiment of user interface 300 may have been identified as the location of the selection box 315, in other embodiments, the zoom location may be based at least in part on a touch location associated with a touchscreen, a location of some other visual indicator relative to the displayed user interface, the center portion or point within the displayed user interface and/or in another manner.

As illustrated, updated user interface 400 includes an item name, "Baseball Cap," that is enlarged relative to its previous display in user interface 300. The updated user interface 400 additionally includes item availability information 404 for item 402. In the illustrated example, the stocking information 404 was not previously presented at any size in the first zoom level of the page (discussed above as initial user interface 300), prior to the navigation application 125 receiving the zoom in request. Additional new content first visible at the second zoom level includes the customer review portion 406 and the place order portion 408. Depending on the embodiment, the user may request to view customer reviews for the item 402 by requesting to zoom in on or near the customer review portion 406 and/or by selecting the customer review portion 406 via a cursor-based or touch-based selection. The user may select to begin the order process for the item 402 by zooming in on or near the place order portion 408.

In some embodiments, the updated user interface 400 may be generated by the browser application 104 and/or navigation application 125 based at least in part on a file that specifies the content to be displayed at each of a number of different zoom levels. For example, prior to presentation of the initial user interface (such as user interface 300 discussed above), the computing device 102 may have received from the zoom-based navigation server 120 a file that includes a number of code segments, markers or controllers that are each associated with a different zoom level. The browser application 104 may have initially interpreted or executed the code segment or controller associated with the first zoom level in the file to present the first user interface 300 for display. Upon receiving a zoom request from the user, the browser application 104 may determine the appropriate zoom level (in this case, the second zoom level) and interpret or execute the code segment or controller associated with the appropriate zoom level in the file.

In some embodiments, a controller associated with a given zoom level may indicate content to be added to the updated user interface once that zoom level is reached. Some portions of the updated user interface may include enlarged versions of content associated with one or more higher zoom levels (in the case of a zoom in request) or decreased-size content associated with one or more lower zoom levels (in the case of a zoom out request). Certain content at a previous zoom level that is not indicated in the file as being related to the newly displayed content may, in some embodiments, be presented differently from the newly displayed content, such as by being blurred or lightened. In some embodiments, a user may request to skip one or more zoom levels (for example, to shift directly from a first zoom level to a fourth zoom level) by selecting a smaller area of a user interface on which to zoom, scrolling at a faster rate, pressing an assigned key and/or in another manner configured in association with the browser application 104.

Depending on the embodiment and/or or the current zoom level of a page to be displayed, the browser application 104 may generate an updated user interface for a new zoom level without communicating with the zoom-based navigation server 120. For example, updated user interface 400 may have been generated by the browser application 104 according to static content or code within a previously retrieved page that identifies content to display at each of a number of zoom levels. In some embodiments, certain zoom levels within a page, such as a zoom level identified in the page data as having content that is contingent upon user input received at another zoom level, may trigger the browser application 104 to request additional information from the zoom-based navigation server 120 in order to dynamically generate content, as discussed in more detail below.

Figure 5:
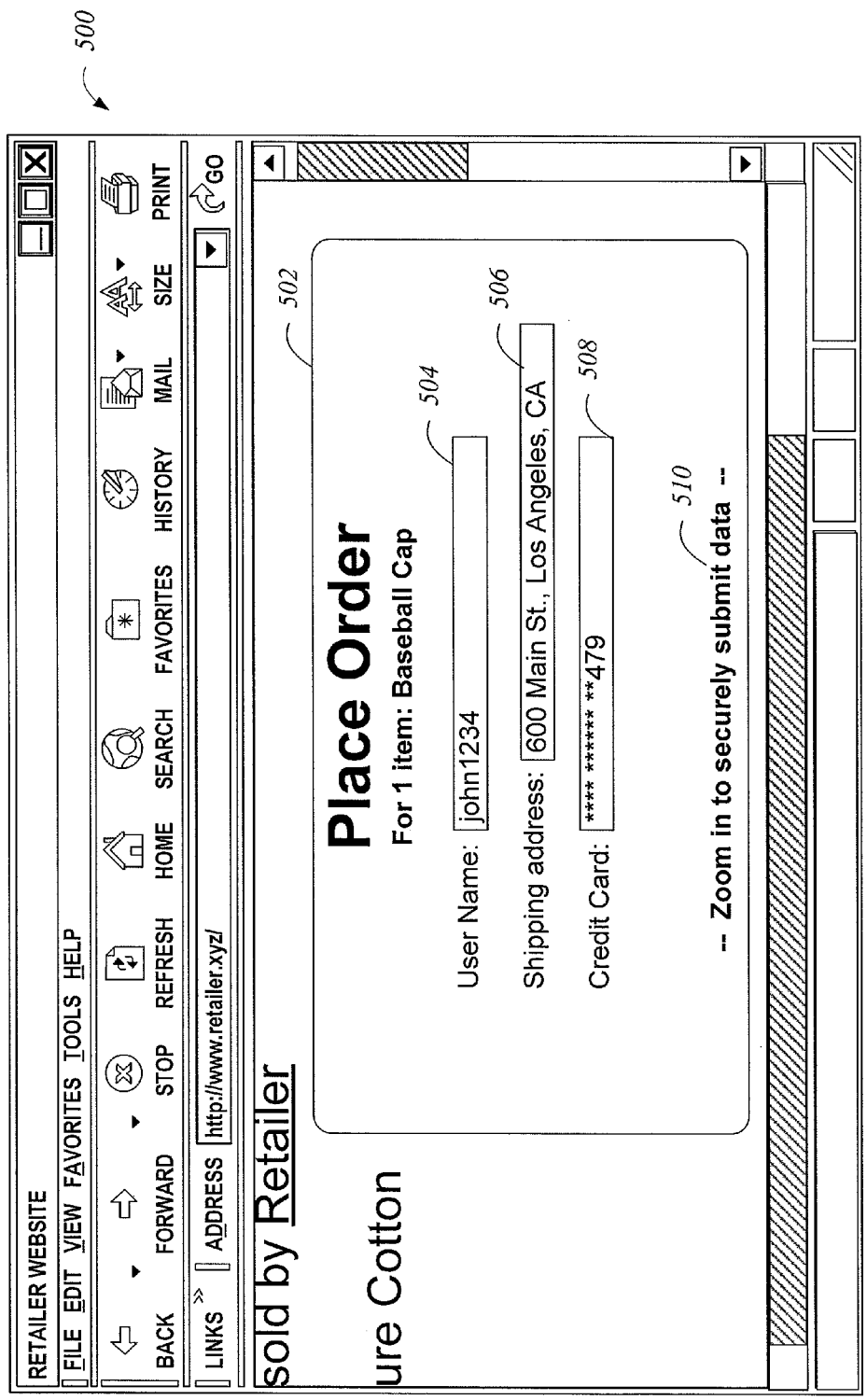
FIG. 5 is a pictorial diagram of an illustrative third zoom level of a portion of a user interface that includes input fields, the inputted contents of which may be submitted to a server via a zoom-in request.

FIG. 5 is a pictorial diagram of an illustrative of a third zoom level of a portion of a user interface 500 that includes input fields 504, 506 and 508. As illustrated in instruction portion 510, the inputted contents of order information 502 may be submitted to a server via a zoom in request by the user. The user interface 500 may be considered an updated user interface generated based at least in part on a zoom in request received in association with display of user interface 400 discussed above. For example, the user may have requested to zoom in on or near the place order portion 408 of user interface 400. In some embodiments, the browser application 102 may have generated the user interface 500 based on page data previously received from the zoom-based navigation server 120 that identifies content to be displayed at a number of different zoom levels, including the current zoom level displayed in user interface 500. In other embodiments, in response to the zoom in request received in association with the display of previously presented user interface 400, the computing device 102 may have sent a request to the zoom-based navigation server 120 to generate at least a portion of the user interface 500. For example, the computing device 102 may have sent zoom location information and/or other data to the zoom-based navigation server 120 in association with a zoom request received from the user.

As illustrated in user interface 500, the user may enter order information in input fields 504, 506 and 508 in order to provide a user name, shipping address and credit card number for the order. As will be appreciated, a number of different input mechanisms or methods may be used in different embodiments, such as text data entry, menu selections, checkboxes and/or others. In some embodiments, the computing device 102 may request data from the zoom-based navigation server 120, the retail server 110 and/or other computing device as the user enters data in one or more of the input fields 504, 506 and 508. For example, in response to the user entering "john1234" as the user's user name in field 504 and/or entering password or credential information, the computing device may communicate with the retail server 110 in order to automatically populate shipping address field 506 with shipping data associated with the "john1234" account with retail server 110.

Once the user has entered the requested data, the user may submit the form fields of order information 502 by zooming in, without necessarily selecting any selectable option or pressing any keyboard key that may traditionally be used to submit form entry information via a browser. Submission of the user-inputted information may include the browser application 104 processing the entered data in order to update the user interface 500 and/or the computing device 102 sending the entered data to the zoom-based navigation server 120 or retail server 110. In some embodiments, user-entered data sent to a server in response to a zoom in request may be sent via a secure transmission, such as by utilizing Transport Layer Security ("TSL") or Secure Sockets Layer ("SSL") or otherwise encrypting the data. If the user decides that he is no longer interested in purchasing the item, he may request to zoom out in order to be presented with content of a higher zoom level, such as the content displayed in user interface 400 or user interface 300 discussed above.

Figure 6:
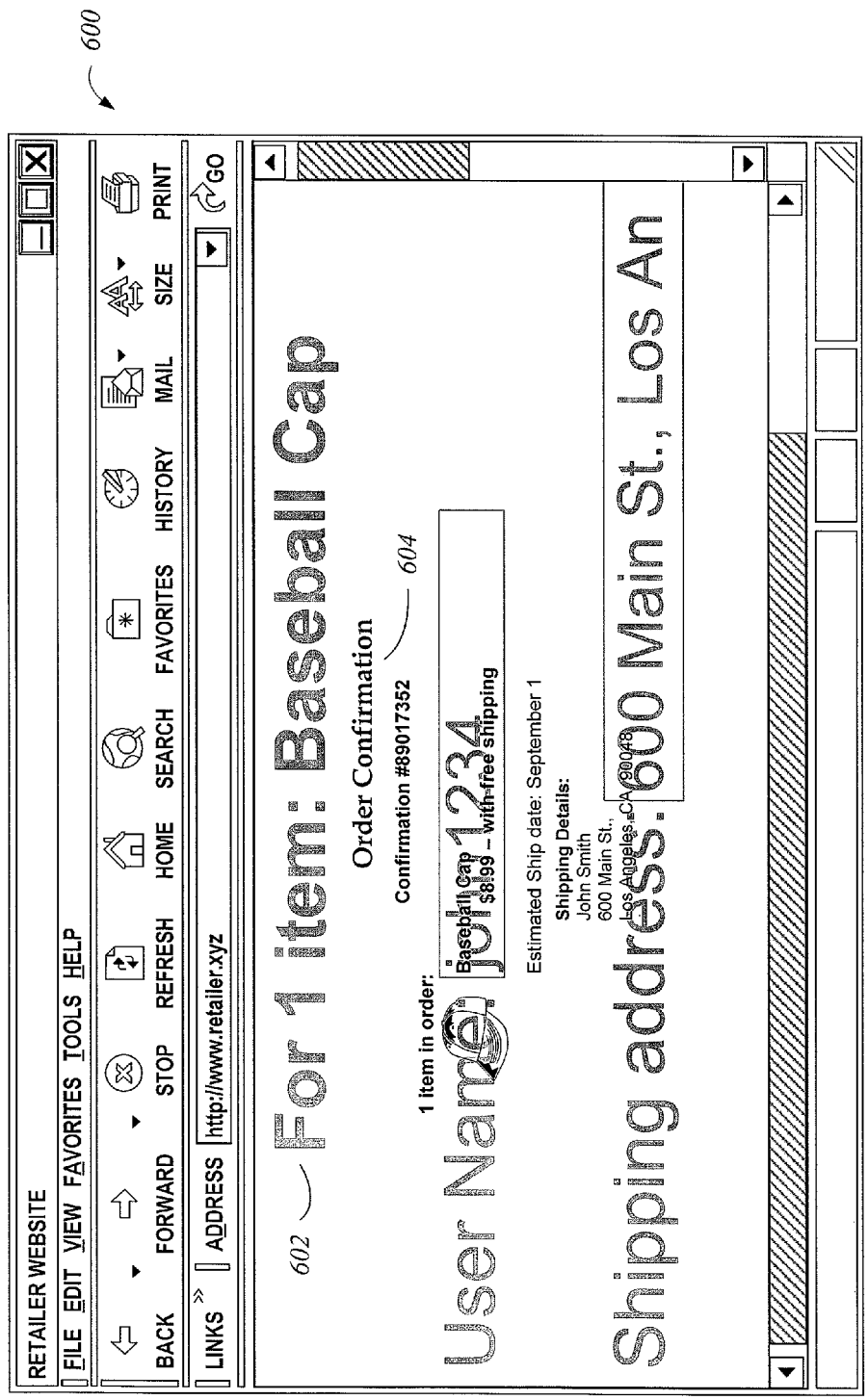
FIG. 6 is a pictorial diagram of an illustrative intermediary presentation displayed between presentation of a third zoom level and a fourth zoom level of portions of a user interface in response to a zoom-in request received during interface presentation at the third zoom level.

FIG. 6 is a pictorial diagram of an illustrative user interface 600 that includes an intermediary presentation or visual transition between two different zoom levels of a page. The visual transition may be generated, for example, by the browser application 104 or the navigation application 125, depending on the embodiment. In the illustrated example, the visual transition (e.g., user interface 600) may be presented for display after a user selects to zoom in on order information 502 within user interface 500. The illustrative user interface 600 may be a snapshot of an animated transition that begins with display of user interface 500 discussed above and ends with display of user interface 700 discussed below. In the illustrative embodiment, the user interface 600 includes overlapping display of content 602 (which includes enlarged portions of user interface 500 discussed above) and content 604 (which includes content of user interface 700 discussed below, but decreased in size from that shown in user interface 700). For example, the visual transition in the illustrated embodiment may include gradually increasing the displayed size of content from both the starting zoom level and the new zoom level while simultaneously fading or lightening the display of the content from the starting zoom level.

A variety of visual transition styles may be employed in different embodiments. For example, a visual transition may include gradually enlarging or shrinking content, morphing from starting content to ending content, gradually blurring or sharpening content, gradually lightening or darkening content and/or other transitions or visual effects. In some embodiments, the user may control the progress of a visual transition. For example, the visual transition between a first zoom level and a second zoom level may progress at a rate that is responsive to a speed that the user moves a mouse, scrolls a scroll wheel, pinches or slides one or more fingers on a touchscreen and/or other some other input velocity. In some embodiments, the visual transitions between zoom levels may be stopped by the user at any point, such that the impression is given to the user of a continuous zoom capability without discrete predefined zoom levels.

Figure 7:
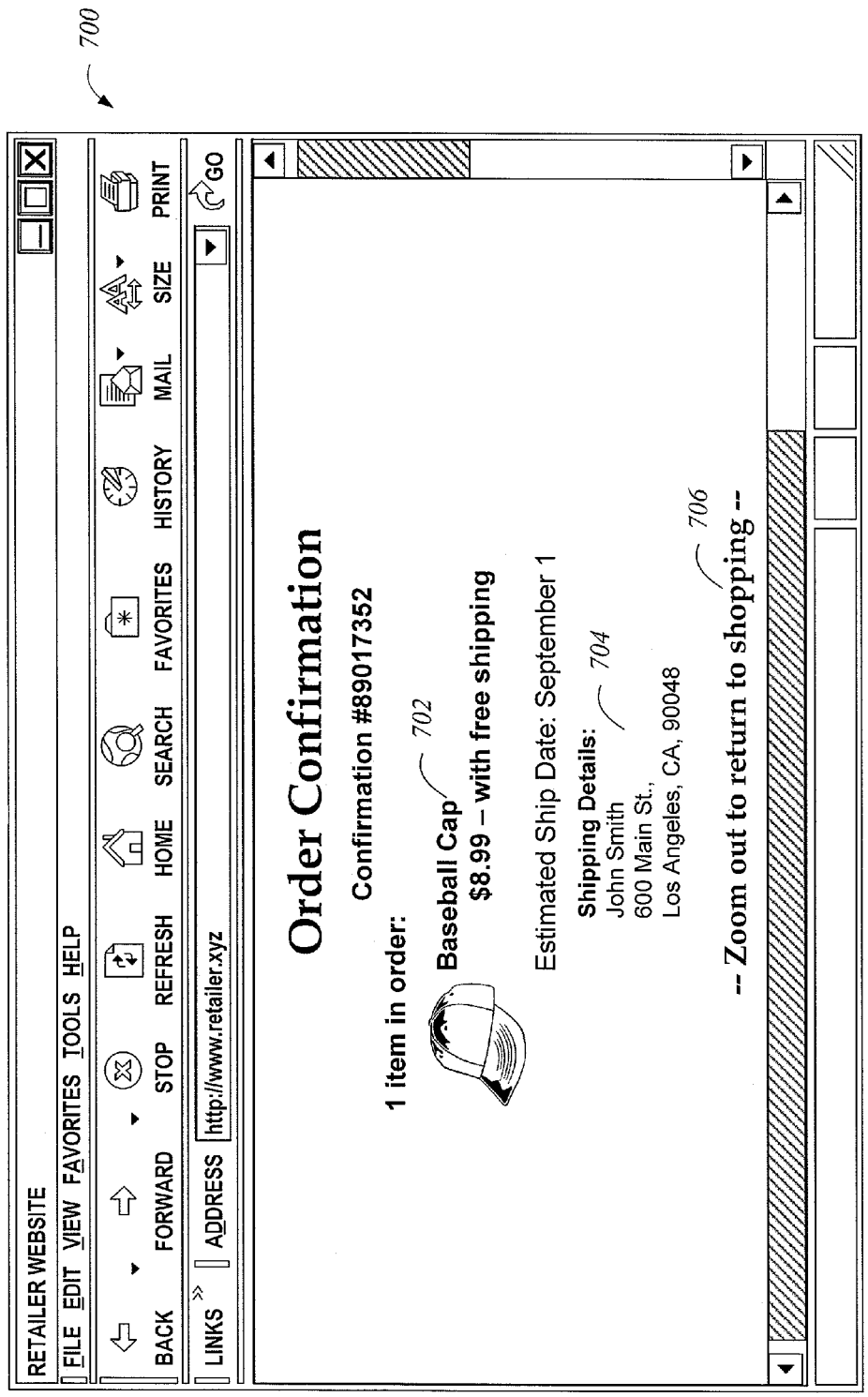
FIG. 7 is a pictorial diagram of an illustrative fourth zoom level of a portion of a user interface that includes content dynamically generated based at least in part on user input received at a previous zoom level.

FIG. 7 is a pictorial diagram of an illustrative user interface 700 presenting a fourth zoom level of the illustrative page(s) discussed above with respect to FIGS. 3-6. The user interface 700 may have been generated or updated based at least in part on a user request to submit order information discussed above with reference to user interface 500. As illustrated, the user interface 700 includes order confirmation information for item 702, including a shipping address 704 for the order. At least some of the content of user interface 700 may have been dynamically generated based at least in part on user input received in association with one or more previous zoom levels, such as the zoom level discussed above with reference to FIG. 5. For example, in response to a zoom request received from the user, the computing device 102 may have submitted the user's inputted order information to the zoom-based navigation server 120. The zoom-based navigation server 120 may then have communicated with the retail server 110 in order to place an order for the item 702, receive an order confirmation number and/or to otherwise process an order for the item 702. The navigation application may then have generated at least a portion of the user interface 700 or generated content to be included in the user interface 700. For example, the navigation application 125 may retrieve from the navigation data store 116 page data, a code portion and/or a controller associated with the given zoom level to determine how to integrate dynamically generated content associated with the order (such as an order confirmation number or item delivery time estimate) with additional content of the new zoom level and/or content of a previous zoom level.

As indicated in text 706, if the user would like to continue browsing additional items for sale or to otherwise continue navigating within content of the page, the user may request to zoom out of user interface 700. Depending on the extent of zooming requested by the user, according to methods discussed above, the browser application 102 and/or navigation application 125 may then present for display an updated user interface that includes content of a higher zoom level, such as the user interfaces 300 or 400 discussed above. Accordingly, in some embodiments, the user may browse a potentially large amount of content by navigating within a single page using zoom in and zoom out requests, rather than requesting separate pages by selecting links or other selectable options for each step of a browse process. Similarly, the user may, in some embodiments, not need to utilize traditional "back" and "forward" page functionality provided by traditional browsers in order to revisit a user interface as previously displayed to the user.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
an electronic data store configured to store a plurality of pages; and
a computing device, comprising a processor, that is in communication with the electronic data store and is configured to:
receive a page that includes content for display at each of a plurality of zoom levels and code indicating portions of the content that should be displayed at individual zoom levels of the plurality of zoom levels, wherein at least a portion of content that the code of the page indicates should be displayed at a first zoom level is different than content that the code of the page indicates should be displayed at a second zoom level of the plurality of zoom levels;
generate for display an initial user interface that includes content that the code of the page indicates should be displayed at the first zoom level;
receive an indication of a zoom in request, wherein the zoom in request comprises a request to view content at the second zoom level; and
based at least in part on the zoom in request:
determine user-inputted text data within a portion of the content displayed at the first zoom level in the initial user interface; and
generate for display an updated user interface based at least in part on content that the code of the page indicates should be displayed at the second zoom level, wherein the updated user interface comprises: (a) an enlarged representation of at least a portion of content previously displayed in the initial user interface, and (b) dynamically generated content that was not previously displayed at any size in the initial user interface, wherein the dynamically generated content is generated subsequent to the zoom in request and is generated based at least in part on the user-inputted text data within the portion of the content displayed at the first zoom level.

2. The system of claim 1, wherein generating the updated user interface comprises:
sending the user-inputted text data to a server; and
receiving data from the server, wherein the dynamically generated content is generated based at least in part on the data received from the server.

3. The system of claim 1, wherein the computing device is further configured to generate a visual transition for display subsequent to display of the initial user interface and prior to display of the updated user interface.

4. The system of claim 2, wherein the user-inputted text data is sent via a secure transmission.

5. The system of claim 1, wherein the initial user interface and the updated user interface are generated without communicating with any other computing systems subsequent to generating the initial user interface.

6. The system of claim 1, wherein the initial user interface is generated based at least in part by executing a first portion of code of the page, wherein the updated user interface is generated at least in part by executing a second portion of code of the page.

7. The system of claim 6, wherein the page comprises a different code portion associated with each of three or more zoom levels.

8. A computer-implemented method comprising:
as implemented by one or more computing devices configured with specific executable instructions,
retrieving a page that includes (a) page data that represents content for display and (b) code that indicates portions of the content that should be displayed at individual zoom levels of a plurality of zoom levels, wherein the code of the page indicates that display of at least a portion of content at a first zoom level of the plurality of zoom levels is contingent upon a user selection associated with a zoom level other than the first zoom level;
determining a current zoom level for display;
based at least in part on a subset of the page data that represents content that the code of the page indicates should be displayed at the current zoom level, generating for display an initial user interface that includes the content displayed at the current zoom level;

receiving a request to display content at an updated zoom level other than the current zoom level;

determining user-inputted text data within a portion of the content displayed at the current zoom level in the initial user interface; and based at least in part on the request and a subset of the page data that represents content that the code of the page indicates should be displayed at the updated zoom level, generating for display an updated user interface that includes the content to be displayed at the updated zoom level, wherein the updated user interface comprises: (a) an enlarged representation of at least a portion of content previously displayed in the initial user interface, and (b) dynamically generated content that was not previously displayed at any size in the initial user interface, wherein the dynamically generated content is generated subsequent to receiving the request and is generated based at least in part on the user-inputted text data within the portion of the content displayed at the current zoom level.

9. The computer-implemented method of claim 8, wherein the request to display content at the updated zoom level is received based at least in part on user manipulation of at least one of a keyboard, touchscreen, scroll wheel, joystick, trackball or mouse.

10. The computer-implemented method of claim 8, wherein the request to display content at an updated zoom level includes information identifying a zoom location within the initial user interface.

11. The computer-implemented method of claim 10, wherein generating for display the updated user interface comprises determining which page portions to display at the updated zoom level based at least in part on the zoom location.

12. The computer-implemented method of claim 10, wherein the zoom location is based at least in part on at least one of: (a) a touch location received in association with a touchscreen, or (b) a location of a moveable visual indicator relative to the initial user interface.

13. The computer-implemented method of claim 8, further comprising:

in response to receiving the request to display content at the updated zoom level, presenting for display a visual transition between display of the initial user interface and display of the updated user interface.

14. A computer-readable, non-transitory storage medium storing computer-executable instructions that, when executed by one or more computer systems, configure the one or more computer systems to perform operations comprising:

receiving page data that includes content for display at each of a plurality of zoom levels and code indicating portions of the content that should be displayed at individual zoom levels of the plurality of zoom levels, wherein at least a portion of content that the code of the page indicates should be displayed at an initial zoom level is different than content that the code of the page indicates should be displayed at a second zoom level of the plurality of zoom levels;

based at least in part on the page data, generating for display an initial user interface that includes content represented in the page data for display at the initial zoom level and does not include content represented in the page data for display at the second zoom level;

determining user-inputted text data within a portion of the content displayed at the initial zoom level in the initial user interface; and updating the user interface in response to a request to view content at a zoom level other than the initial zoom level, wherein at least a portion of the updated user interface includes content that is determined based at least in part on (a) content that the code of the page indicates should be displayed at the second zoom level and (b) the user-inputted text data within the portion of the content displayed at the initial zoom level, wherein the updated user interface includes content not previously displayed at any size in the initial user interface.

15. The computer-readable, non-transitory storage medium of claim 14, wherein the request comprises a zoom in request, wherein the updated user interface includes at least a portion of content of the initial user interface displayed with increased size relative to the portion of content as displayed at the initial zoom level.

16. The computer-readable, non-transitory storage medium of claim 14, wherein the request comprises a zoom out request, wherein the updated user interface includes at least a portion of content of the initial user interface displayed with decreased size relative to the portion of content as displayed at the initial zoom level.

* * * * *